INVENTORS.
DONALD E. CLARK
PAUL J. HESS
BY
John F. Cullen
ATTORNEY—

One

United States Patent Office 3,248,878
Patented May 3, 1966

3,248,878
THRUST DEFLECTOR AND REVERSER
Donald E. Clark and Paul J. Hess, Cincinnati, Ohio,
assignors to General Electric Company, a corporation
of New York
Filed Sept. 18, 1963, Ser. No. 309,618
7 Claims. (Cl. 60—35.54)

The present invention relates to a thrust deflector, and more particularly, to a thrust deflecting means for use in a cruise fan type powerplant in which the deflecting is done in two stages. Additionally, means for reversing the thrust is also disclosed.

A typical powerplant considered for aircraft propulsion is the type known as a cruise fan. Generally, this is a powerplant in which a centerbody may carry a large fan at its forward end which is surrounded by a tubular casing member or a nacelle through which air is pumped by the fan to produce thrust. Conveniently, the fan may be of the tip turbine type where turbine buckets are mounted on the end of the fan blades and are driven by exhaust gas from gas generator means that may be located elsewhere. Additionally, straight turbojets with free fans may be used. Such cruise powerplants are highly efficient and move large quantities of air at low velocities. Additionally, in an aircraft employing such powerplants, it is desirable to provide lift and this may be done by rotating the whole engine, be it a jet engine or a cruise fan, in a well known manner. The difficulty with rotating a cruise fan in its nacelle is that cruise fans of the tip turbine type are generally quite large both in diameter and length. Rotation is not practical as the powerplant might strike the ground, its proximity to the ground creates undesirable back pressure, and rotation requires very large actuation forces. Furthermore, in some installations, it may be desirable to have the nacelle mounted on the forward edge of the wing to provide air flow over and under the wing. In other words, the wing may cut the nacelle substantially in half with half the nacelle above and half below the airfoil or wing. Other mounting arrangements may carry the powerplant on pylons as is well known. With such powerplants, thrust reversal is desired for slowing the aircraft in landing. The usual form of mounting the powerplants as mentioned above, excluding mounting on the ends of the wings, does not permit a rotation of the nacelle and a more practical means of obtaining vertical lift and reversal in such a powerplant is to divert or deflect the fan stream downward. This creates difficulty with the upper stream over the top surface of the wing in those installations spanning the wing and a solution for this is disclosed in co-pending application Serial No. 309,-656, filed September 18, 1963, concurrently herewith and assigned to the assignee of the instant application.

Additionally, the cruise fan is different from an ordinary jet engine in that it is a low pressure ratio device and is quite sensitive to back pressure. That is, if structural blockage is imposed behind the fan to turn or deflect the flow downward, the back pressure on the fan is increased and this results in a performance loss.

A more effective way to turn the flow is through a cascade of louvers which do not produce much back pressure and can operate on a free stream. A cascade of the impulse type can thus turn the flow without any appreciable pressure drop. Such a cascade merely consists of a series of preferably airfoil louvers that may be fixed in a frame or made to rotate in a frame or whose camber may be changed. Generally, such cascades with louvers therein are well known. In some installations it may be necessary to us a long, many louvered cascade for sufficient deflection. This creates a large structural member which requires large actuation forces and presents a stowage problem. It is possible however, to obtain as much deflection and more by the use of tandem cascades and deflection in two stages.

Projecting cascades across the cruise fan exhaust creates a problem of what to do with the cascades when deflected thrust is not desired in such a large powerplant. In other words, during the cruise mode, the cascades must be stowed out of the way in a practical manner. In operation, they must intercept the stream at an angle, for example 45° which, in conjunction with the camber of the individual louvers, may deflect the flow 90° or more with little pressure change across the fan. Additional turning beyond 90° by a different camber or by movable louvers, as well as a different angle of the whole cascade frame, or the use of a separate tandem cascade, may provide thrust reversing in a cruise fan.

Cruise fans may generally take two forms. They may be of the plug nozzle type which, in conjunction with a shroud around it, forms a nozzle between the plug and shroud and the plug extends beyond the downstream end of the shroud. The annular nozzle between the two may be varied to provide different thrust. In such an application, the plug member is convenient for stowage of the cascades and such a type is shown in co-pending application Serial No. 309,689 filed September 18, 1963, and assigned to the assignee of the instant invention.

The other type of cruise fan may employ a finger type nozzle and this differs from the plug nozzle arrangement in providing a casing or nacelle with a variable finger nozzle or its equivalent at the downstream end of the casing member. In this type powerplant a centerbody may be provided as an aerodynamic member for the flow of fluid through the casing and may also be supported centrally of the casing and carry a cruise fan for accelerating air or thrust fluid longitudinally through the casing or nacelle. Additionally, the centerbody may form the anchor point for the whole powerplant. The cruise fan may conveniently be a tip turbine fan of the type that is well known in the art and is driven by exhaust gas acting on turbine buckets and then exhausting into the air stream. It is in this latter type of powerplant that the thrust deflector of the instant invention is described but not limited.

The primary object of the present invention is to provide a thrust deflector of the type described which is easily stowed within the confines of the structure present in the jet propulsion powerplant and deflects the thrust fluid moving longitudinally through the powerplant in two stages through tandem cascades.

Another object is to provide such a thrust deflector in a wing mounted cruise fan type installation where two sets of independently operable cascades are provided to obtain thrust vectoring.

A further object is to provide a thrust deflector that may be used for reversing the thrust in two stages.

Another object is to provide a thrust deflecting means of the type disclosed which may be used for both horizontal and/or vertical thrust or any combination therebetween.

A further object is to provide a nacelle structure in which the cascades may be conveniently stowed during the cruise operation.

Briefly stated, the invention is directed to a jet propulsion powerplant of the cruise fan type which has a tubular casing member or nacelle with a centerbody member disposed centrally of the nacelle and the nacelle ends or terminates in a nozzle at its downstream end. Preferably, this nacelle has a portion of substantially rectangular cross-section therein. The nacelle is provided with a tip turbine fan means on the centerbody to move thrust fluid longitudinally through the nacelle or casing member. Thrust deflecting means is provided for this powerplant and comprises a pair of louvered cascades disposed above the central horizontal plane of the powerplant and a similar pair of cascades disposed below said plane with the cascades being disposed substantially within the rectangular cross-section. Each pair of cascades includes a first cascade supported from one of the members with actuation means connected to the first cascade to move it into open position across the fluid passage to intersect thrust fluid and deflect it toward the casing member. A second cascade is provided and is supported on the casing at an opening through the casing in the rectangular cross-section and the second cascade forms an angle with the first cascade to intersect the deflected fluid from the first cascade for further deflection. Additionally, the individual louvers of the various cascades may be variable for thrust vectoring and the pairs of cascades are independently operable for combination cruise and lift components on the powerplant.

While the specification includes claims particularly pointing out and distinctly claiming the subject matter which is regarded as the invention, it is believed the invention will be better understood from the following description taken in connection with the accompanying drawing in which:

FIG. 4 is a partial plan view of the door mechanism.

Figure 1:
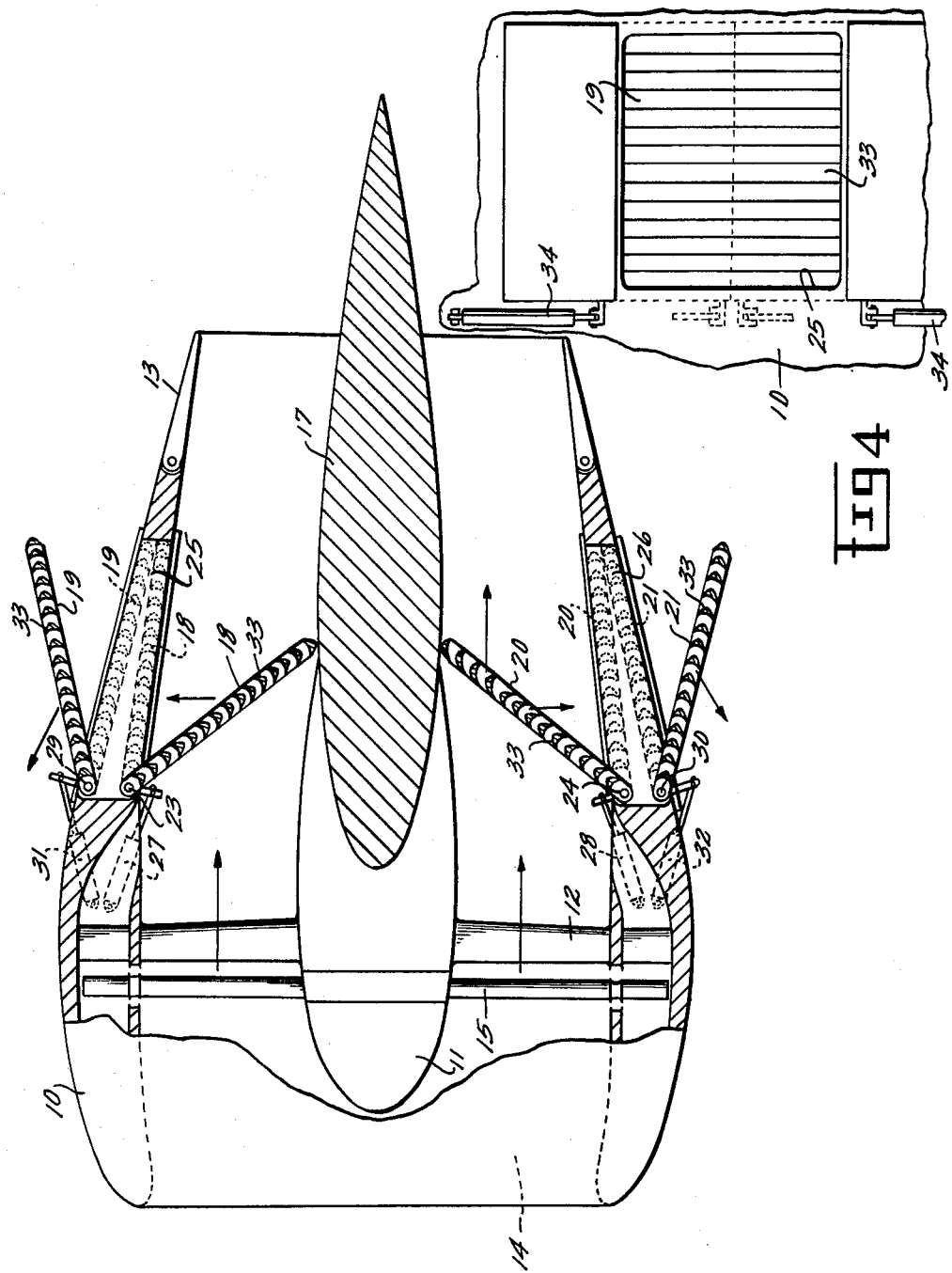
FIG. 1 is a partial sectional view of a powerplant of the type disclosed showing the two stage deflection of the thrust fluid.

Referring first to FIG. 1, there is shown a typical cross-sectional view of the tandem cascade arrangement employed in a cruise fan powerplant. In such a powerplant, the outer boundary is formed by a tubular casing member 10 which may be a nacelle. Casing member 10 surrounds a centerbody member 11 which is disposed centrally thereof and from which the casing member is supported through suitable struts 12. In the type of powerplant shown the nacelle or casing member terminates in a nozzle 13 at its downstream end and this nozzle will normally be of the variable finger type as is well known. In order to move the air or thrust fluid longitudinally through passage 14 within the casing, the centerbody 11 supports a fan 15 which may conveniently be of the tip turbine type. In this type, fan 15 is driven by exhaust gases impinging on turbine buckets 16 which gas is supplied from gas generators not shown. The exhaust from both the fan and the turbine may enter passage 14 in a well known manner and the details for this form no part of the present invention.

The powerplant just described will normally be supported by the wings of an aircraft in some manner. For example, it may be supported in the customary fashion by pylons as is well known or may span the aircraft wing as is diagrammatically shown in the drawing. In this latter case, the wing is shown at 17 and the powerplant may be mounted on the leading edge of the wing as shown.

It should be apparent at this point that the wing 17 might also be treated as a cross-sectional view of a pylon in those cases where the powerplant is pylon-mounted below the wing in the customary manner. In those cases the thrust deflection means that will hereinafter be described is strictly a thrust reversing mechanism and, as shown in FIG. 1, fluid is deflected from the sides of the powerplant and forwardly for such thrust reversal. However, in the case chosen for illustration, it is desired to have member 17 represents a wing with the powerplant partially above and partially below the wing as shown. In this case it will be apparent that thrust reversal and lift may be obtained from the powerplant by means to be described.

In order to obtain thrust deflection, whether a combination of reversal and lift or either one alone, it is desired to use louvered cascades because they create negligible back pressure and a cruise fan as shown is a low pressure ratio device whose performance is sensitive to throttling created by back pressure. If the incoming flow through the cruise fan is to be turned a large amount, for example, up to 170° or more, it will be apparent that a single cascade would be very long and have many louvers. This creates problems of actuation as well as stowage. In order to overcome these disadvantages the present invention proposes to obtain thrust deflection in two stages by means of tandem cascades at an angle to each other. To this end, there is provided a pair of louvered cascades 18 and 19 disposed above the central horizontal plane of the powerplant through the airfoil or wing 17 as shown in FIG. 1. A similar pair of cascades 20 and 21 is disposed below the horizontal plane. In order to move the cascades for stowage during cruise operation first cascades 18 and 20, that are encountered by the thrust fluid flowing through the powerplant, may be supported from either of the members 10 or 11, or, in some cases, from wing 17. As shown, it is convenient to pivot the cascades on the casing at 23 and 24 for rotation into the thrust fluid. The casing is provided with openings 25 and 26 therein for the passage of the deflected fluid and these openings also serve as a stowage recess for pivoted cascades 18 and 20 when stowed.

Suitable actuating means 27 and 28 are connected to the first cascade to move them into open position across passage 14 to intersect the thrust fluid and deflect the intersected fluid toward the casing member 10 as is apparent in FIG. 1. It is important to note that the actuating means 27 and 28 are preferably independently operable.

As shown, the thrust fluid is deflected about 90° by the first cascade toward its opening in the casing member. In order to further deflect the intersected fluid, the second cascade members 19 and 21 are provided and these may be conveniently pivoted to the casing about pivots 29 and 30 under the operation of actuators 31 and 32. It will be apparent that the second cascades 19 and 21 intersect the deflected fluid from the first cascades and turn it approximately another 90° forward to provide complete reversal of the thrust fluid.

Modulation of the deflected thrust may be obtained by providing the individual louvers 33 with any suitable means for rotation or varying the camber thereof. A means for the latter is shown in application Serial No. 294,049, filed July 10, 1963, now U.S. Patent No. 3,172,621, and assigned to the assignee of the instant application.

In order to stow the cascade members within casing 10, it is convenient to use relatively thin cascades to the extent that they may be rotated into stacked relation within the casing member. In other words, the pair of cascades 18 and 19 stacked together are accommodated in opening 25 to be as thick as casing member 10. For cruise operation it is then necessary to close the openings, such as 25, and suitable closing means such as the sliding doors and actuators 34 as shown in FIG. 4 provide the smooth walls necessary when the cascades are not in operation. Simplification of the mechanical problems presented may be obtained by providing a substantially rectangular cross-section of casing member 10 in the area of the cascades and openings so that the cascades may be substantially flat for easy stowage in the casing member 10.

A wide modulation of thrust vectoring is obtainable by the selective operation of louvers 33 by suitable means mentioned above. It will be apparent that the first cascades 18 and 20 may, by selective operation of the louvers, permit some of the airflow to pass straight through as shown by the arrow for horizontal thrust while the rest is deflected for lift. When thrust reversal is desired, all of the fluid would preferably be reversed although any combination of through flow and diverted flow may be obtained by the cascade louver structure disclosed. Similarly the independent operation of the pairs of cascades permits the fan flow in the upper portion of the casing to pass rearwardly for horizontal thrust in which case the upper cascades 18 and 19 are completely retracted whereas the lower cascades 20 and 21 may intersect and divert the fluid downwardly for lift. This may be desirable in the transition stage of flight. Thus, a wide range of vectoring or modulated thrust is obtainable.

Figure 2:
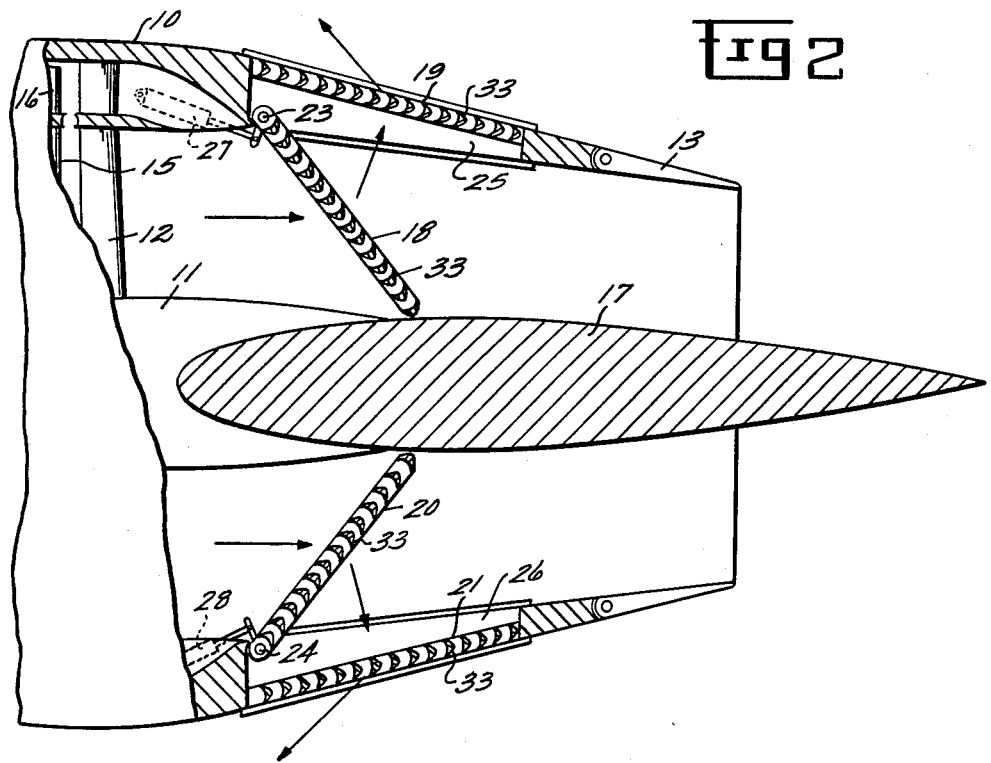
FIG. 2 is a view similar to FIG. 1 wherein one of the pairs of cascades is preferably fixed.

Referring next to FIG. 2, there is illustrated an arrangement similar to that described in connection with FIG. 1 and the same reference numerals apply to the same parts. However, in this arrangement some simplification is used by having the second cascades 19 and 21 fixed within casing 10. Again cascades 18 and 20 may be supported from either centerbody member 11 or casing member 10 in the manner described in connection with FIG. 1 and only the first cascades 18 and 20 are rotatable into the openings 25 and 26 where the second fixed cascades 19 and 21 are recessed in the opening at an angle to the first cascades. The folded or stowed position again is a stacked relation of the first cascade 18 over the second cascade 19 (and similarly below) and the same means 34 may be used to close the openings 25 and 26. In this arrangement, the amount of deflection in the different cascades is different with the first cascades 18 and 20 deflecting the flow through a minor angle into the fixed cascades 19 and 21 which accomplish the major portion of the turn.

Figure 3:
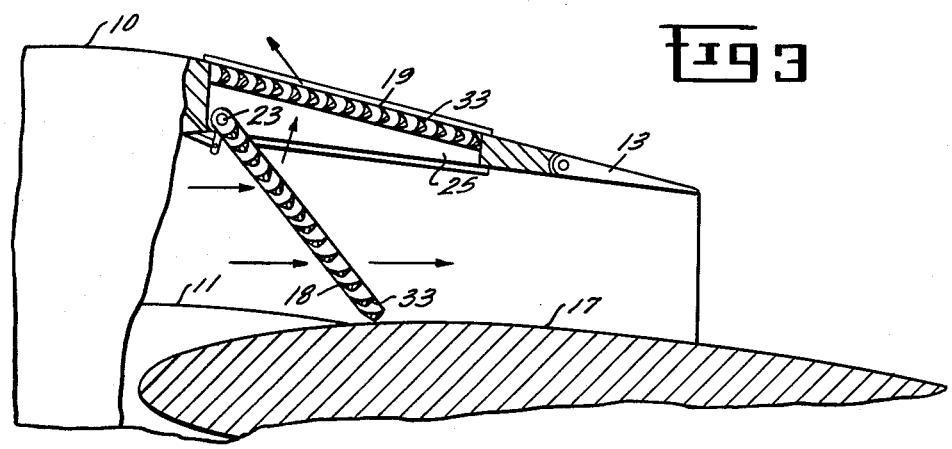
FIG. 3 is a view similar to FIG. 2 illustrating an arrangement for modulating the magnitude of thrust including reverse thrust, in extremely short time intervals through two stages of cascades.

One of the features that is very desirable in a thrust reverser is the ability to modulate the magnitude of reverse thrust in extremely short time intervals. This is obtainable by the structure shown in FIG. 3 where the individual louvers 33 are selectively movable within the first cascades to vary the direction of flow through the cascades so that a combination of through flow and deflected flow may be obtained in any combination desired. With the louvers 33 in the selective moved position shown, part of the flow passes through for horizontal thrust and part is diverted for lift and/or reverse thrust. Thus, cascade 18 permits none, all, or any fraction of the flow to be diverted. By varying the fraction, the actual thrust vector can be varied from full reverse thrust to full forward thrust. It will be apparent that the use of substantially all reverse thrust may be obtained by the structure described when thrust deflection is to the side of the powerplant as would be the case where thrust member 17 is a pylon. Additionally, thrust reversal is obtainable when member 17 is a wing as shown in FIG. 1 and a wide combination of through flow and lift flow is obtainable, the flexibility being widely variable. A short time constant for modulating the reverse thrust is possible because the amount of variable geometry required in FIGS. 2 and 3 is small and the inertia is very low.

While there have been described preferred forms of the invention, obvious modifications and variations are possible in light of the above teachings. It is therefore to be understood that within the scope of the appended claims, the invention may be practiced otherwise than as specifically described.

We claim:
1. A jet propulsion powerplant having a tubular casing member with a portion of substantially rectangular cross-section therein and a centerbody member disposed centrally thereof, said casing member terminating in a nozzle downstream of said portion, fan means on said centerbody to move thrust air longitudinally in a passage through said casing member, thrust deflection means comprising,
   a pair of louvered cascades disposed above the central horizontal plane of the powerplant and a pair disposed below substantially within said rectangular cross-section,
   each pair including a first cascade pivotally supported from said casing member,
   actuation means connected to said first cascade to move it into open position across said passage to intersect said thrust fluid and deflect it toward said casing member,
   a second cascade supported on said casing at an opening through said casing in said rectangular cross-section and upstream of the nozzle,
   said second cascade forming an angle with said first cascade to intersect said deflected fluid from the first cascade for further deflection, said first cascade being pivotal into said opening out of the thrust air.
2. Apparatus as described in claim 1, wherein said fan means is a tip turbine fan.
3. Apparatus as described in claim 1 wherein,
   said louvers in said cascades are selectively movable therein to vary the direction of fluid flow therethrough and,
   means on said casing to close the openings therein over said cascades.
4. Apparatus as described in claim 1 wherein said second cascade is pivoted to said casing for pivoting into and out of the openings therein,
   said cascades of a pair being stacked in said opening,
   means on said casing to close the opening therein over said cascades and,
   said louvers in said first cascades are selectively movable therein to vary the direction of fluid flow therethrough.
5. Apparatus as described in claim 1 wherein,
   said second cascades are recessed within said openings in said casing whereby said first cascades pivot into closed stacked relation over said second cascades and,
   means on said casing to close the openings therein over said cascades.
6. Apparatus as described in claim 5 wherein said louvers in said cascades are selectively movable to change the direction of fluid flow therethrough.
7. Apparatus as described in claim 5 wherein said louvers in one of said cascades are selectively movable to change the direction of fluid flow therethrough.

References Cited by the Examiner

UNITED STATES PATENTS

| | | | |
|---|---|---|---|
| 2,681,548 | 6/1954 | Kappus | 60—35.54 |
| 2,774,554 | 12/1956 | Ashwood et al. | 244—23 |
| 2,929,580 | 3/1960 | Ciolkosz | 244—12 |
| 2,932,164 | 4/1960 | Watson | 60—35.54 |
| 2,945,346 | 7/1960 | Arnzen | 60—35.54 |
| 2,947,501 | 8/1960 | Flint. | |
| 2,997,845 | 8/1961 | Oulianoff | 60—35.54 |
| 3,002,343 | 10/1961 | Baird | 60—35.54 |
| 3,016,700 | 1/1962 | Howald | 60—35.54 |
| 3,028,121 | 4/1962 | Klapproth | 244—23 |
| 3,035,792 | 5/1962 | Klapproth | 60—35.54 X |
| 3,040,524 | 6/1962 | Kurti | 60—35.54 |
| 3,087,303 | 4/1963 | Heinze et al. | 60—35.55 |

FOREIGN PATENTS

| | | |
|---|---|---|
| 21,627 | 7/1961 | Germany. |
| 739,500 | 11/1955 | Great Britain. |
| 913,312 | 12/1962 | Great Britain. |
| 922,645 | 4/1963 | Great Britain. |

MARK NEWMAN, *Primary Examiner.*

A. L. SMITH, *Assistant Examiner.*